United States Patent
Massarani et al.

(10) Patent No.: US 6,751,654 B2
(45) Date of Patent: Jun. 15, 2004

(54) SIMULATING WEB COOKIES FOR NON-COOKIE CAPABLE BROWSERS

(75) Inventors: Leonardo Coutinho Massarani, Westport, CT (US); Tapas Kumar Som, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,660

(22) Filed: Mar. 31, 1999

(65) Prior Publication Data

US 2003/0158889 A1 Aug. 21, 2003

(51) Int. Cl.[7] ............................................. G06F 15/16
(52) U.S. Cl. ..................... 709/219; 709/246; 709/230
(58) Field of Search ................................ 709/200, 217, 709/219; 713/202; 7705/14

(56) References Cited

U.S. PATENT DOCUMENTS

| | | | |
|---|---|---|---|
| 5,586,260 A | * 12/1996 | Hu | 704/272 |
| 5,781,614 A | * 7/1998 | Brunson | 379/88.14 |
| 5,835,724 A | 11/1998 | Smith | |
| 5,875,296 A | * 2/1999 | Shi et al. | 713/202 |
| 5,948,061 A | * 9/1999 | Merriman et al. | 709/219 |
| 5,987,480 A | * 11/1999 | Donohue et al. | 715/501.1 |
| 6,167,441 A | * 12/2000 | Himmel | 707/104.1 |
| 6,263,360 B1 | * 7/2001 | Arnold et al. | 707/10 |
| 6,374,359 B1 | * 4/2002 | Shrader et al. | 709/229 |
| 6,381,632 B1 | * 4/2002 | Lowell | 709/203 |
| 2002/0099600 A1 | * 7/2002 | Merriman et al. | 705/14 |

FOREIGN PATENT DOCUMENTS

| | | |
|---|---|---|
| WO | WO 97/40457 | 10/1997 |
| WO | WO 99/64967 | 12/1999 |

OTHER PUBLICATIONS

Schwartz, Randal L., "Making a Cookie Jar" New Architect (Formerly Web Techniques), Dec. 1998.*
Schwartz, Randal L., Source code provided with "Making a Cookie Jar" article, Dec. 1998.*
Schwartz, Randal L., "How to be Virtually Anonymous" New Architect (Formerly Web Techniques), Feb. 1997.*
Tomsen, Mai–Lan, "Smoothing Customer Friction on E–Commerce Web Sites," Microsoft Interactive Developer, Mar., 1999 No. 12, pp. 32–39, ASCII Corp. (Translation Provided).
Microsoft Corporation, "Microsoft Internet Information Server Resource Kit," pp. 311–316, published by ASCII Corp., Jul. 11, 1998 (Translation Provided).

* cited by examiner

Primary Examiner—David Wiley
Assistant Examiner—Joseph E Avellino
(74) Attorney, Agent, or Firm—Richard A. Tomlin; Stephen Bongini; Fleit, Kain, Gibbons, Gutman, Bongini & Blanco P.L.

(57) ABSTRACT

In a computer network such as the Internet including one or more servers and one or more user units or clients wherein at least some user units do not transmit client identification information such as Web cookies, a method and system for performing the method for a server to communicate with at least one of the client units, comprising the steps of: receiving an access request from one of the user units, the user unit including a network browser; determining whether the access request received originated from a cookies capable or cookies enabled network browser; and simulate and proxy cookies support at the server, on behalf of the network browser, at the server when it is determined that the access request received did not originate from a non-cookies capable or non-cookies enabled network browser.

23 Claims, 4 Drawing Sheets

| | | | | | | |
|---|---|---|---|---|---|---|
| 00000000 | 47455420 | 68747470 | 3a2f2f69 | 73692e6c | GET http://isi.1 | <- Web Page Request |
| 00000010 | 61676175 | 64652e69 | 626d2e63 | 6f6d2f63 | agaude.ibm.com/c | |
| 00000020 | 67692f77 | 6d3f6d65 | 74686f64 | 653d4166 | gi/wm?method+Af | |
| 00000030 | 66696368 | 65724672 | 616d6573 | 26746865 | focjerFrames&the | |
| 00000040 | 6d653d69 | 7369266c | 616e6775 | 653d6672 | me=isi&language=fr | <- Web Page Parameters |
| 00000050 | 26646174 | 613d6672 | 5f77656c | 635f6d65 | &data=fr_welcome | |
| 00000060 | 266f7574 | 73696465 | 3d592048 | 5454502f | &outside=Y HTTP/ | |
| 00000070 | 312e300d | 0a526566 | 65726572 | 3a20687a | 1.0..Referer: ht | |
| 00000080 | 74703a2f | 2f697370 | 5f31322e | 6c616761 | tp://isp_12.laga | <- Web Page Referred From |
| 00000090 | 7564652e | 69626d2e | 636f6d3a | 31363038 | ude.ibm.com:1608 | |
| 000000a0 | 302f6969 | 6f702f6a | 732f6465 | 6d6f2f65 | 0/iiop/js/demo/e | |
| 000000b0 | 73706163 | 655f7065 | 72736f6e | 6e656c2e | space_personnel. | |
| 000000c0 | 6874696c | 3f534d53 | 7375626d | 69742e78 | html?SMSsubmit.x | |
| 000000d0 | 3d373926 | 534d5373 | 75626d69 | 742e793d | =79&SMSsubmit.x | |
| 000000e0 | 3626783d | 33392679 | 3d33350d | 0a50726f | =79&SMSsubmit.y= | |
| 000000f0 | 78792d43 | 5f6e6e65 | 5374696f | 6e3a204b | 6&x=39&y=35..Pro | |
| 00000100 | 6565702d | 416c6976 | 650d0a55 | 7365722d | xy-connection: K | |
| 00000110 | 4167656e | 743a204d | 6f7a696c | 6c612f34 | ee-Alive .. User- | |
| 00000120 | 2e303620 | 5b656e5d | 20285769 | 6e39353b | Agent : Mozilla/4 | <- Browser and Client Host Information |
| 00000130 | 2049203b | 4e617629 | 0d0a486f | 73743a20 | .06 (en) (Win95; | |
| 00000140 | 6973692e | 6c616761 | 7564652e | 69626d2e | I , Nav)..Host: | |
| 00000150 | 636f6d0d | 0a416363 | 5570743a | 20696d61 | isi.laguade.ibm | |
| 00000160 | 67652f67 | 699622c20 | 696d6167 | 652f782d | com..Accept: ima | |
| 00000170 | 78626974 | 6d61702c | 20696d61 | 67652f6a | ge/gif, image/x- | |
| 00000180 | 7065672c | 20696d61 | 67652f70 | 6a706567 | xbitmap, image/j | |
| 00000190 | 2c20696d | 6167652f | 706e672c | 202a2f2a | peg, image/pjpeg | |
| 000001a0 | 0d0a4163 | 63657074 | 2d456e63 | 6f64696e | , image/png, */* | |
| 000001b0 | 673a2067 | 7a69700d | 0a416363 | 6570742d | ..Accept-Emcpdom | |
| 000001c0 | 4c616e67 | 75616765 | 3a20656e | 0d0a4163 | g:gzip..Accept- | |
| 000001d0 | 63657074 | 2d436861 | 72736574 | 3a206973 | Language: en..Ac | |
| 000001e0 | 6f2d383 | 35392d31 | 2c2a2c75 | 74662d38 | cept-Charset: is | |
| 000001f0 | 0d0a436f | 6f6b6965 | 3a207861 | 7574683d | 0-8859-1.*UTF-8 | |
| 00000200 | 343322b | 666f726d | 2b393138 | 31333433 | ..Cookie: xauthor= | <- Cookie 422 is user id cookie fields separated by "+" |
| 00000210 | 36352b66 | 32653831 | 63336365 | 64353562 | 422+form+918343 | |
| 00000220 | 37346133 | 37666333 | 63326633 | 66306638 | 65+f2e81c3ced55b | |
| 00000230 | 3730350d | 0a0d0a | | | 74a87fc3c2f3f0f8 | |
| | | | | | 705 ... | |

FIG. 5

SIMULATING WEB COOKIES FOR NON-COOKIE CAPABLE BROWSERS

BACKGROUND OF THE INVENTION

1. Field of the Invention

The present invention relates to the field of computer networks and more particularly to the Internet and World-Wide Web (WWW or simply, the Web) networks.

2. Description of Related Art

The Internet is a network of computers and computer networks linked worldwide. The Web is a service that provides graphical links among the computers in the Internet. This is accomplished with the HyperText Markup Language (HTML) that provides the functionality for creating user-friendly links among Web pages. Users of the Web employ Web browsers such as Netscape and Mosaic to browse the Web.

Many Web browsers have the capability to accept certain pieces (one or more packets) of information called cookies from Web sites visited. Cookies are transmitted by Web servers to the user (client) so that they are stored by the Web browser in the user's computer and read back by the server on subsequent visits by that user. The cookie is automatically transmitted by the user's computer to the server on subsequent visits to that site. Servers can collect information about the user including product or site preferences or other personal information provided by the user, and write that information or an access key to that information into the cookie. Thus, the Web server can tailor the content presented to the user based on those preferences. All of this can be done transparently to the user. Cookies serve the purpose of identifying users and their preferences to Web sites over multiple visits to that site.

While many Web users do not mind receiving cookies, others do not like them, viewing them as invasive intruders and hence those users disable their browsers' ability to receive or process cookies. Moreover, some Web browsers do not support them at all. However, many sites have infrastructure that is designed to work with cookies and which would not operate fully or at all when the site is visited by users with non-cookie enabled browsers. Therefore there is a need for a method and system to overcome the above shortcomings in the art. In particular, it is highly desirable to overcome these shortcomings without requiring extensive reprogramming of the Web site's applications.

SUMMARY OF THE INVENTION

In a computer network including one or more servers and one or more user units, at least some of which present graphical user interfaces, a method for a server to communicate with at least one of the user units, comprising the steps of:
  receiving an access request from one of the user units, the user unit including a network browser;
  determining whether the access request received originated from a cookies capable or cookies enabled network browser; and
  simulate and proxy cookies support at the server, on behalf of the network browser, at the server when it is determined that the access request received originated from a non-cookies capable or non-cookies enabled network browser (for convenience, both of these kinds of browsers will be called "non-cookies capable" browsers hereafter).

BRIEF DESCRIPTION OF THE DRAWINGS

FIG. 5 is a sample trace of a Web Client HTTP Request with a cookie.

DETAILED DESCRIPTION OF PREFERRED EMBODIMENTS

Preferred embodiments of the present invention will be described in detail hereinbelow with reference to the attached drawings.

Figure 1:
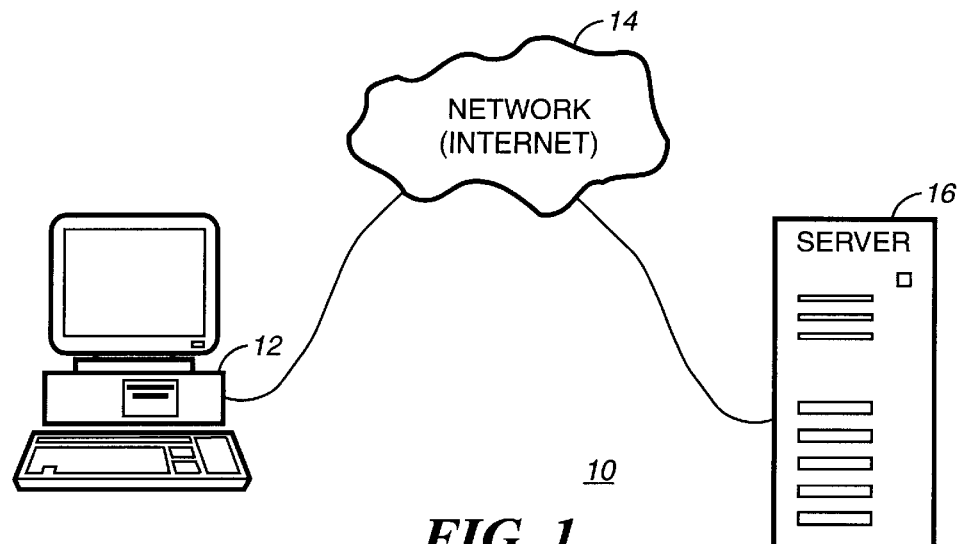
FIG. 1 is a block diagram of a computer network in accordance with one aspect of the invention.

FIG. 1 shows a computer network 10 comprising (i.e., including but not limited to) at least one end user station 12 and a Web server 16, both connected to a computer network such as the Internet 14. The end user unit 12 can be a commercial model of a desktop microcomputer such as our IBM Aptiva TM personal computer or other information processing apparatus suitable for communicating with a computer network. The server 16 can be any of various commercially available server computers programmable to operate in accordance with the invention. The end user station 12 is connected to the server 14 via a computer network such as the Internet 14 or other wide area network (WAN) or local area network (LAN).

Figure 2:
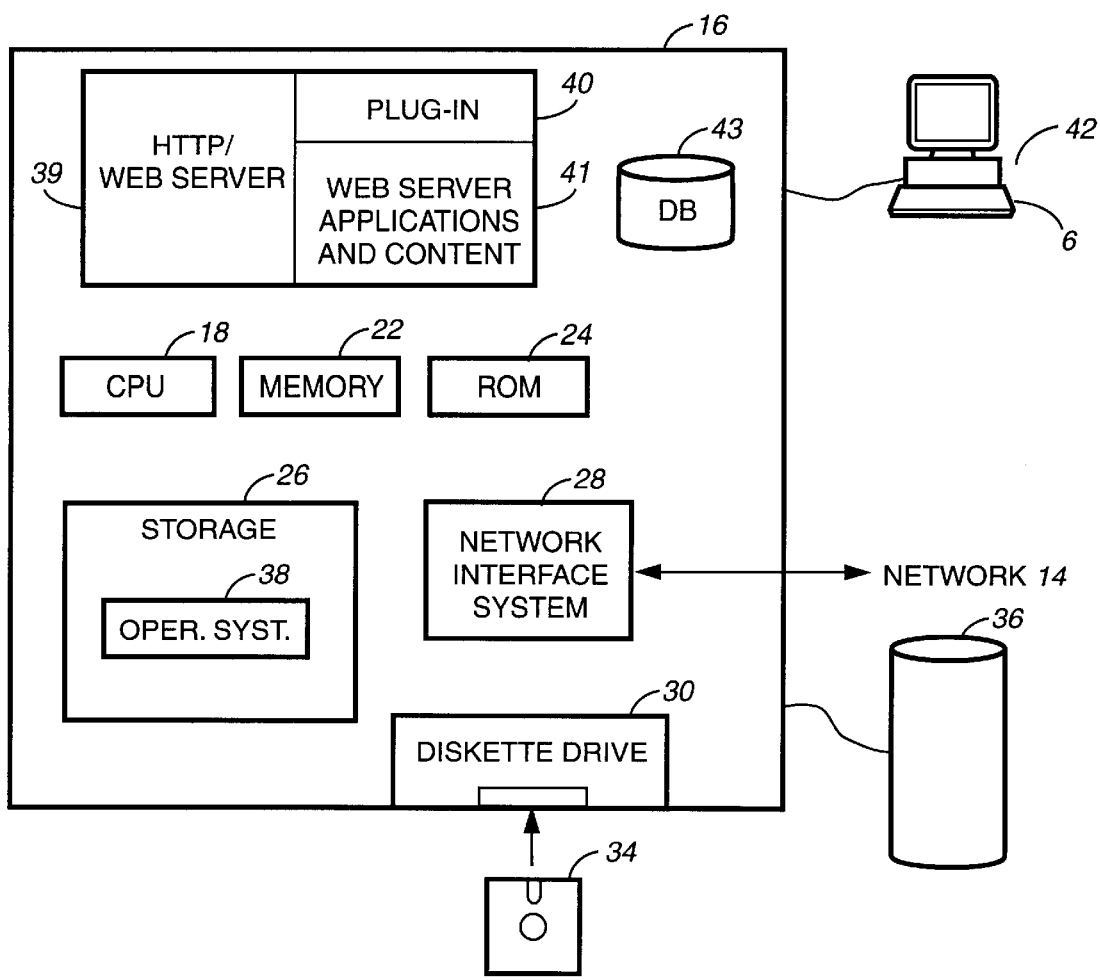
FIG. 2 is a block diagram of a network server in accordance with one aspect of the invention.

FIG. 2 is a block diagram of the network server 16 which is shown in FIG. 1. The server 16 comprises conventional elements such as a cpu 18, working memory (e.g., RAM) 22, a Read-Only Memory (ROM) 24, a storage device (e.g., a hard disk drive) 26, and a network communications subsystem or interface (e.g., a modem) 28. The server system 16 may also include a plurality of conventional input/out (I/O) devices such as a control console 42 having a screen display, keyboard and mouse, and a diskette drive 30 for receiving computer-readable media such as diskette 34. The server 16 may also include external storage 36 for additional capacity. These components are connected by any of several well-known buses and other connections (not shown) and are only representative of common components used in servers suitable for use on the Internet or other WANs. The elements shown herein are only representative of a Web server and other well known components have been omitted for simplicity. The storage device 26 of the Web server 16 comprises various items of software including an operating system 38 and a plug-in application program 40 in accordance with the invention. The server also comprises HTTP/WEB Server software 39 comprising a plug-in 40 in accordance with the invention, a set of Web server applications and content 41 and a database 43 for storing user authentication and preferences information. Although in this embodiment a general purpose server computer is programmed to operate in accordance with the invention it is also possible to implement the invention with specialized hardware.

In operation, the user of station 12 attempts to access the Web server 16. As mentioned above, the Web server 16 has a server application or plug-in 40 inserted in the HTTP (hypertext transfer protocol) processing stream 39. Various servers have similar but different facilities for configuring such a plug-in process.

Figure 3:
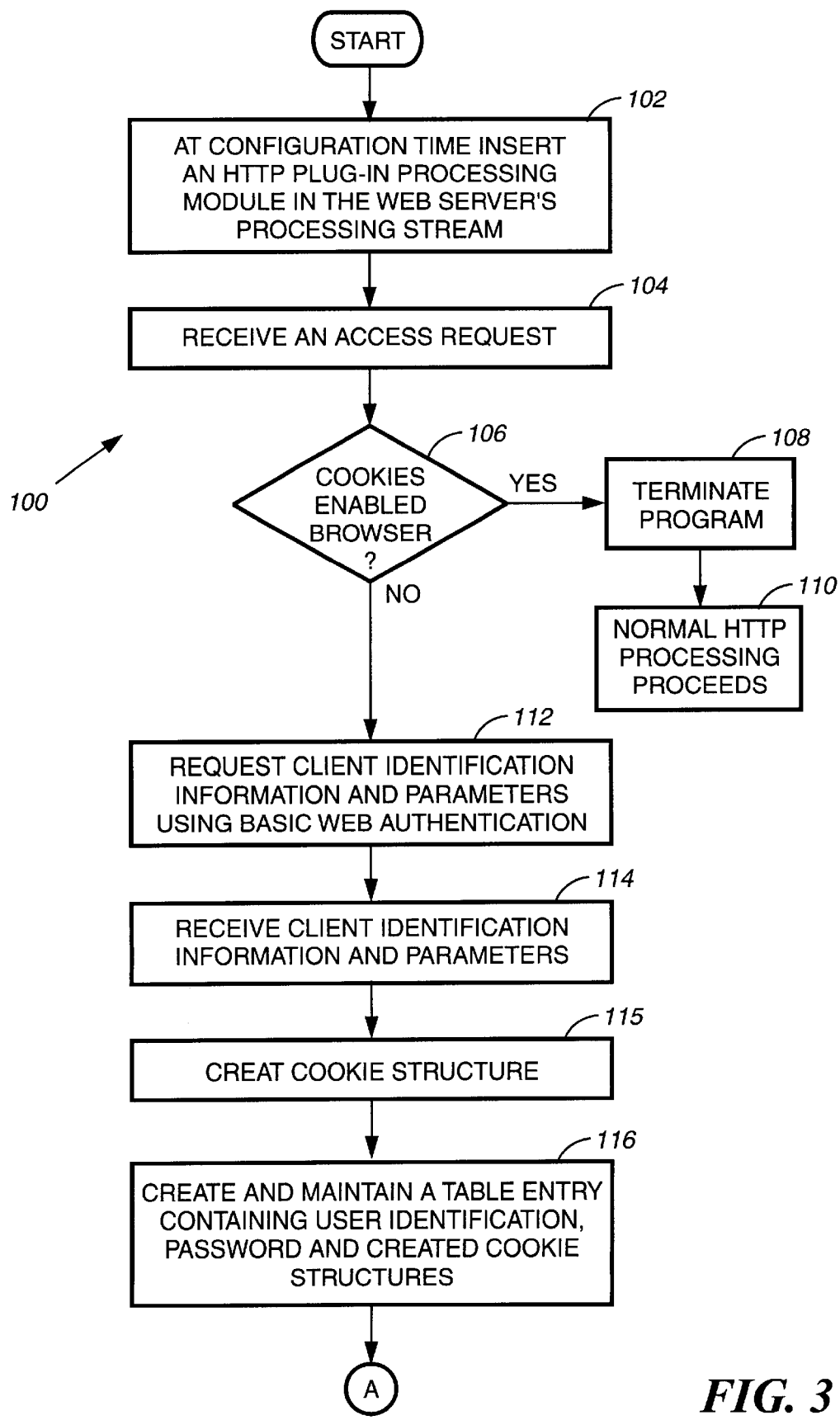
FIG. 3 is a flow chart showing a process for simulating Web cookies in accordance with one aspect of the invention.

Referring to FIG. 3 there is shown a flow chart illustrating a method 100 in accordance with the invention. The process starts when a client unit 12 transmits an access request to server 16.

The plug-in 40 is the primary means for implementing the invention. The Web Server is configured to activate a processing plug-in (step 102) whenever a client Web request is received to one or more areas of the server. This is implemented using standard Web Server Application Programming Interface (APIs) such as the Netscape Enterprise Server APIs.

Normally, the server 16 presents the user 12 with a log in/password panel, creating an identification cookie, and sends it to the user Web browser. In step 104 the Web server 16 receives the access request and invokes the pre-configured plug-in. The plug-in 40 determines in step 106 whether the user's Web browser (in Unit 12) is cookies-capable or enabled, by parsing the incoming HTTP request and its headers and using a pre-configured look-up table of known Web-browser types and reported header fields. If the Web-browser is cookies-capable (step 108), the plug-in 40 terminates and the HTTP processing proceeds (step 110) as usual for that Web server 16.

If the Web browser is not cookies-capable (step 112), the Web server plug-in 40 implementing this invention will proceed to simulate and proxy cookies support on behalf of the user's Web-browser. The plug-in 40 can do this by authenticating the user and creating an area of memory containing the information that would be stored in the cookie residing at a user's computer. Thus the server 16, upon receiving an access, would insert the client information stored in the server into the access request just as if that information had been received from a cookie received from the client. By doing that, the plug-in 40 will allow the Web server 16 and its applications to service that user without changes to server's implementation. The cookie proxying plug-in performs the following functions:

1. For identification/authentication of the user, the plug-in challenges (or prompts) the user for identification and a password using a Basic HTTP Authentication process, which is supported by all known browsers. This causes the user's Web browser to display a dialog box for the user to type log in and password information. These are transmitted back to the server (plug-in) not in the clear, but as a uu-encoded string (which is sufficient security for most applications), and is all that is available in the early Web browsers. Uu-encoding is a scheme which converts 8 bit data such as programs, to a 6 bit format for transmission through 6, 7, or 8 bit (typically electronic mail) networks. Such 6 or 7 bit networks are commonly found in mainframe or UNIX operating system environments.
2. After receiving (step 114) the user identification and password, the plug-in uu-decodes and authenticates the user, against the authentication facilities available on that Web server site and its applications. This typically involves a database look-up or the invocation of an identification and password validation process.
3. After validating and authenticating the user, the plug-in generates a proxy cookie structure for that user (step 115). This proxy cookie (or cookies) can be generated using one of several embodiments, including:
    a. A fixed format cookie with fields that are a direct function of the user's identification, such as a user ID number.
    b. A cookie with fields that are a function of the user's identification and a configuration table or database lookup, a user name, city name, gender, or age.
    c. A cookie with fields that are a function of the user's identification and a collection of parameters returned from calling application programming interfaces and methods of Web server applications, such as a user ID, user name, preferences for application 1 or preferences for application 2.

After generating the proxy cookie or cookies on behalf of the user, the plug-in 28 creates and maintains (step 116) a table entry containing uu-encoded user identification, password and the created cookie structures. This table will be maintained for an active user session, including time-out and garbage collection processing (i.e., entries will be removed if not used within 15 minutes or entries will be cleared after one hour of first use forcing a re-authentication of the user.

Figure 4:
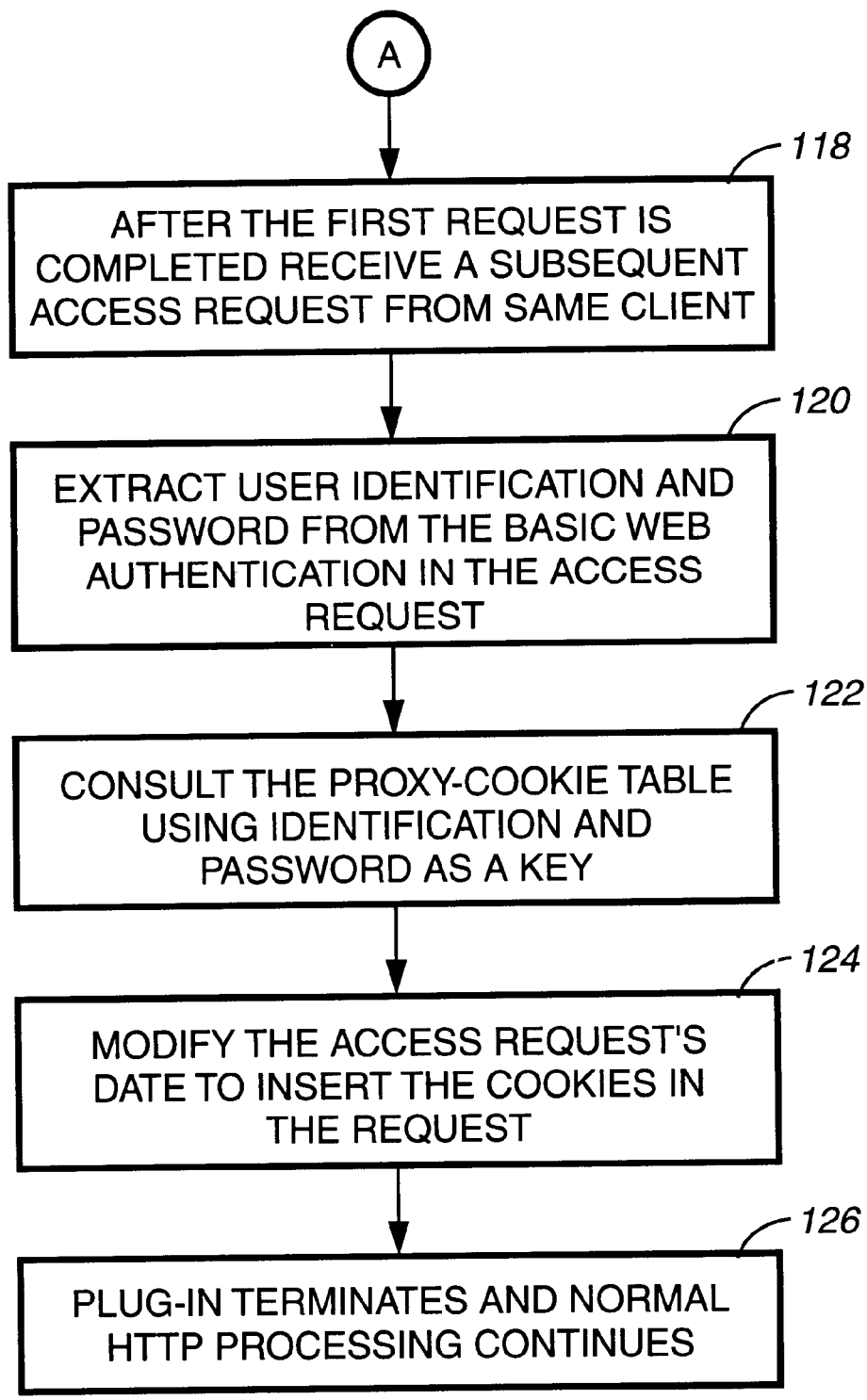
FIG. 4 is a continuation of the process of FIG. 3.

For the first and all subsequent access to that server (or other servers within the same domain), the user's Web browser will include the uu-encoded identification and password in the HTTP request headers. Referring to FIG. 4 after the initial session wherein the proxy cookie was created the server receives a subsequent access request from the same user (step 118). Upon receipt of subsequent access request from that user's unit the proxy plug-in will intercept that request and perform the following actions:

1. Extract uu-encoded user identification and password from the HTTP request (step 120).
2. Consult its proxy-cookie table using identification and password as the key and retrieving the proxy cookie structures (step 122).
3. Modify the HTTP request's data to insert the proxy cookie (or cookies) in the request (step 124).

The proxy cookie plug-in then terminates (step 126) and HTTP processing of the request continues in the Web server site. The remaining of the Web server site and its applications are unaware that the user's Web browser lacked cookies support and can perform their tasks efficiently and without reprogramming.

The implementation of this invention, as described above, will enable Web server sites to use cookies for user identification and personalization even for users utilizing non-cookies capable browsers. It involves no modification to the user's Web browser and assumes that bare minimum of the HTTP protocol that is universally implemented in all Web browsers. Existing Web server sites already using cookies can support these non-cookies capable browsers without reprogramming of applications, with adequate security, without browser discrimination and with high-performance, due to the server side plug-in and in-memory implementation of data structures.

Each of the above functions is preferably implemented with the structure disclosed in FIG. 1 and FIG. 2. Specifically, the CPU 18 reads and executes instructions from memory 22 or storage 26. A significant advantage of this invention is that it does not rely on the IP address of the end-user machine (browser) to maintain a user identification/authorization session. This is important due to the increasing popularity of Firewalls and Proxy/Cache servers located between the end-user machine and Web sites. Some alternative session identification implementations for non-cookies enabled browsers have attempted to maintain session states using the end-user IP address in a table. This does not work if there are firewalls or proxy/cache servers between the client and the server. Therefore the solution provided by this invention results in a significant advantage because it works regardless of firewalls or proxy/cache servers in the client-to-server path.

Popular and high-volume Web server sites are often implemented as a cluster of independent servers, front-ended by a dispatcher. This invention can work in this environment by one for three ways:

1. Add the first authentication and cookie-simulation plug-in to the dispatching server. This has the advantage of processing the cookie/table creation activities only once, regardless of how many back-end servers and how many requests a client makes to that site. One potential disadvantage is that it is usually desirable to have the dispatching server capable of processing 10 to 100 times more requests per second than the other servers in the cluster. So, adding this code to the dispatcher could bring its performance below the desired limits.

Some of the new, more sophisticated dispatching software may be able to guarantee that all requests from a client end up in the same back-end server in the cluster—this will be the optimum implementation.

2. The first server in the cluster (behind the dispatcher) that gets a request form a new client and creates a simulated cookie and table entry, pushes this into (via HTTP, HTTPS or another API) to its peer processing modules in the other servers in the cluster. This has the advantage of a single cookie creation (with the corresponding database lookup and authentication) action. One potential disadvantage is that multiple updates in the other servers will be done and not used if the user uses the site for a single or very few requests. This option is a good compromise assuming a particular site receives several requests from a client that are spread over many of the servers in the cluster and it is not possible to add the cookie support plug-in to the dispatching server.

3. The first server in the cluster processing a request creates the cookie and authentication table entry. If subsequent requests from that client reach another server, that server will use the enclosed HTTP basic authentication fields to inquire other servers in the cluster for the cookie to build its own table entry. This assumes that asking other servers for the entry/cookie is less expensive than accessing the DB and building the cookie again—that remains an option if it is less expensive in a particular implementation. This option is expected to be the least attractive.

High-volume sites visited by many concurrent users, may cause very large HTTP basic Id/password to cookie in-memory tables to be created in the servers. In order to address the possible performance implications of this, the following is used:

1. Use hashing algorithms to build and search the tables.
2. Implementing aggressive timeouts to remove inactive table entries within short periods of time. It may be advisable to time stamp the table with either the time of creation an/or the time of last access. A background process should then scan the table and implement a clean-up policy that takes into account the typical user access patterns for that site. An example of a trace of a Web client HTTP request with cookie is shown in FIG. 5.

This invention's primary application is for Web-server sites that want to positively identify the user (not just the client machine or browser with a persistent cookie) on every access session. These sites/applications will always challenge the user for identification and possibly also for password. They then will create and serve a cookie that is valid for that browser session only, not saved in permanent storage (such as a PC hard disk file), and valid for a finite amount of time (slightly greater than typical maximum user session time). The cookie will contain user identification as well as personalization and past history information to better serve the user. Sites and applications which provide user and profile-based or influenced content typically have a large investment in application and content delivery around cookies and data-mining. The system according to the invention is intended to enable these sites and applications to transparently serve non-cookies enabled browsers without site-wide modification.

An alternative implementation to maintaining a table of browser HTTP header "signatures" to determine which browsers support or have cookies enabled, is as follows:

1. Assume, at the time of first access, that the browser does not support cookies—treat all browsers the same, therefore eliminating the need to maintain browser handling lists.
2. Process the User as described in this invention, introducing the simulated cookie in the stream. Simulated cookie will have at least one field that tells it apart from the normal cookie.
3. Also send a normal (as opposed to simulated) cookie to the browser.
4. At the time of second access, if both a normal and simulated cookie are found in the HTTP request, clear the authentication/simulated cookie table entry for this user, so that for all subsequent accesses, there is no cookie-simulation processing.

This option should be exercised if it becomes hard to manage and determine which browsers need this invention's support. There is a minor performance penalty to issue two cookies on the first access, and perform two unnecessary table updates.

While there has been illustrated and described what are presently considered to be the preferred embodiments of the present invention using the WWW and HTML, it will be understood by those skilled in the art that various other modifications may be made both in WWW applications as well as in implementing in other client-server access protocol systems, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments or protocols disclosed, but that the invention include all embodiments falling within the scope of the appended claims.

What is claimed is:

1. In a computer network including one or more servers and one or more user units, at least some of which present graphical user interfaces, a method for a server to communicate with at least one of the user units, the method comprising the steps of:

receiving a first access request from one of the user units, the user unit including a network browser;

determining whether the first access request received originated from a non-cookies capable or cookies enabled network browser; and simulating and proxying cookies support, on behalf of the network browser, at the server when it is determined that the first access request received originated from a non-cookies capable or non-cookies enabled network browser, wherein the step of simulating and proxying cookies support includes the sub-steps of:

receiving a user ID and a password from the one user unit from which the first access request was received;

generating a proxy cookie structure, the proxy cookie structure including a user identification field that is a function of the user ID received from the one user unit; and creating a table entry that includes the user ID received from the one user unit, the password received from the one user unit, and the proxy cookie structure that was generated.

2. The method of claim 1, wherein the determining step comprises parsing the first access request and its headers to determine the type of browser that sent the request.

3. The method of claim 2, wherein the parsing step comprises using a lookup table of known browser types and reported header fields.

4. The method of claim 1, wherein the step of simulating and proxying cookies support further includes the sub-step of prompting the one user unit the user ID and password.

5. The method of claim 4, wherein in the sub-step of receiving the user ID and password, an encoded string of characters comprises the user ID and password.

6. The method of claim 5, wherein the step of simulating and proxying cookies support further includes the sub-step of decoding the encoded string of characters and authenticating the user requesting access.

7. The method of claim 4, wherein the network includes the Internet.

8. The method of claim 1, further comprising the steps of:
when it is determined that the first access request originated from a cookies enabled network browser, generating a normal cookie that is different than the proxy cookie that would have been generated if the first access request would have originated from a non-cookies capable or non-cookies enabled network browser.

9. The method of claim 1, wherein the means for simulating and proxying cookies support further includes the sub-steps of:
receiving a second access request from the one user unit, the second access request including the user ID and the password;
using the user ID and the password in the second access request to locate the table entry; and
modifying the second access request so that the second access request includes the proxy cookie from the table entry that was located.

10. A machine-readable medium encoded with a program for a server to communicate with at least one user unit for performing the steps of:
receiving a first access request from the user unit, the user unit including a network browser;
determining whether the first access request received originated from a non-cookies capable network browser; and
simulating and proxying cookies support, on behalf of the network browser, at the server when it is determined that the first access request received originated from a non-cookies capable or non-cookies enabled network browser,
wherein the step of simulating and proxying cookies support includes the sub-steps of:
receiving a user ID and a password from the one user unit from which the first access request was received;
generating a proxy cookie structure, the proxy cookie structure including a user identification field that is a function of the user ID received from the one user unit; and
creating a table entry that includes the user ID received from the one user unit, the password received from the one user unit, and the proxy cookie structure that was generated.

11. The machine-readable medium as defined in claim 10, wherein the determining step comprises parsing the first access request and its headers to determine the type of browser that sent the request.

12. The machine-readable medium as defined in claim 11, wherein the parsing step comprises using a lookup table of known browser types and reported header fields.

13. The machine-readable medium as defined in claim 10, wherein the step of simulating and proxying cookies support further includes the sub-step of prompting the one user unit for the user ID and password.

14. The machine-readable medium as defined in claim 13, wherein in the sub-step of receiving the user ID and password, an encoded string of characters comprises the user ID and password.

15. The machine-readable medium as defined in claim 14, wherein the step of simulating and proxying cookies support further comprises the sub-step of decoding the encoded string of characters and authenticating the user requesting access.

16. The machine-readable medium as defined in claim 10, further comprising the steps of:
when it is determined that the first access request originated from a cookies enabled network browser, generating a normal cookie that is different than the proxy cookie that would have been generated if the first access request would have originated from a non-cookies capable or non-cookies enabled network browser.

17. A Web server for providing information from a database to a user's system, said Web server comprising:
means for receiving a first access request from one user unit, the user unit including a network browser;
means for determining whether the first access request received originated from a cookies capable or cookies enabled network browser; and
means for simulating and proxying cookies support, on behalf of the network browser, at the server when it is determined that the first access request received originated from a non-cookies capable or non-cookies enabled network browser,
wherein the step of simulating and proxying cookies support includes:
receiving a user ID and a password from the one user unit from which the first access request was received;
generating a proxy cookie structure, the proxy cookie structure including a user identification field that is a function of the user ID received from the one user unit; and
creating a table entry that includes the user ID received from the one user unit, the password received from the one user unit, and the proxy cookie structure that was generated.

18. The Web server as defined in claim 17, wherein the means for determining comprises means for parsing the first access request and its headers to determine the type of browser that sent the request.

19. The Web server as defined in claim 17, wherein the means for parsing comprises a lookup table of known browser types and reported header fields.

20. The Web server of claim 17, wherein the means for simulating and proxying cookies support further includes means for prompting the one user unit for the user ID and password.

21. The Web server of claim 20, wherein an encoded string of characters comprises the user ID and password.

22. The Web server of claim 21, wherein the means for simulating and proxying cookies support further includes means for decoding and authenticating the user requesting access.

23. The Web server of claim 17, wherein the step of simulating and proxying cookies support further includes:
means for receiving a second access request from the one user unit, the second access request including the user ID and the password;
means for using the user ID and the password in the second access request to locate the table entry; and
means for modifying the second access request so that the second access request includes the proxy cookie from the table entry that was located.

* * * * *